United States Patent [19]

Grundtner

[11] Patent Number: 4,668,526

[45] Date of Patent: May 26, 1987

[54] METHOD OF MAKING MAGNETIC HEAD FOR COMPUTERS

[75] Inventor: Matthias J. Grundtner, St. Paul, Minn.

[73] Assignee: Data Recording Technology Corporation, Minneapolis, Minn.

[21] Appl. No.: 824,774

[22] Filed: Jan. 31, 1986

Related U.S. Application Data

[62] Division of Ser. No. 413,546, Aug. 31, 1982, Pat. No. 4,589,043.

[51] Int. Cl.[4] .................................................. B05D 1/08
[52] U.S. Cl. ..................................... 427/34; 427/423; 118/69
[58] Field of Search ............... 360/125, 126, 122, 121; 427/34, 423

[56] References Cited

U.S. PATENT DOCUMENTS

| | | | |
|---|---|---|---|
| 3,375,574 | 4/1968 | Woods et al. | 360/126 X |
| 3,908,194 | 9/1975 | Romankiw | 360/122 |
| 4,078,097 | 3/1978 | Miller | 427/34 |
| 4,079,430 | 3/1978 | Fujishima et al. | 360/125 |
| 4,366,516 | 12/1982 | Ogata et al. | 360/130.24 X |

Primary Examiner—Shrive P. Beck

[57] ABSTRACT

A magnetic head for use with a magnetic tape information recording, storage and retrieval computer system which includes applying a hard, wear-resistant coating to an inexpensive molded plastic body to drastically reduce the cost of the magnetic head component without reducing its reliability or stability and also the method of producing such a magnetic head.

3 Claims, 3 Drawing Figures

METHOD OF MAKING MAGNETIC HEAD FOR COMPUTERS

This is a division of application Ser. No. 413,546 filed 8/31/82 now U.S. Pat. No. 4,589,043.

BACKGROUND OF THE INVENTION

The magnetic head is by far the most expensive component of magnetic tape drive computer equipment. The head costs two to three times more than any of the other components. In spite of the fact that the cost of almost all of the other components of a computer have been dramatically reduced during the last ten to fifteen years, the construction and the cost of the magnetic heads has remained the same. These are very critical components of all magnetic tape drives, and the tolerances for stability and positioning accuracy of these heads must be kept to within forty to fifty millionths of an inch.

Some time ago, a sprayed-on ceramic wear coating was developed for tape-engaging heads for computer memory systems. In 1972, I prepared an article which was published in *Electronics Magazine* for June 19, 1972 which described this spraying process in conjunction with the development of the ceramic wear coating material. This sprayed-on wear coating is accomplished with high temperature (up to 30,000° F.) spraying techniques. The spraying operation deposits a coating of a material which is fed into a jet stream of extremely hot, high-speed, inert gases produced within a spray gun such as is manufactured by Metco, Inc., Westbury, Long Island, N.Y. (type 7M plasma gun).

At the present time, brass is the most common material used for the base or substrate. Brass is not only extremely heavy, but is also relatively expensive when compared with molded plastic material. Due to the extremely high temperatures of the sprayed-on, wear-resistant material, plastic has not been used as a substrate and was not believed to be a feasible material for this purpose; however, I have discovered that by carefully controlling the temperature rise of the prepared substrate body during the depositing of the layer of stabilizing, wear-resistant material on the tape-engaging wear surface of the plastic body, an inexpensive, light-weight magnetic head can be successfully produced. A magnetic head embodying this invention can be produced for only forty to fifty percent of the cost of producing the present heads using a brass substrate. This is a reduction of between fifty and sixty percent in the selling price of this component.

SUMMARY OF THE INVENTION

This invention incorporates in a magnetic computer tape head, the use of a plastic body material, either thermoplastic or thermosetting plastic. This produces a lighter-weight, substantially less expensive head unit. This is accomplished by molding or otherwise forming the head body from an inexpensive plastic material assembling the element of the head and spraying a stabilizing wear coating onto the tape-engaging surface of the head.

For this spraying process, the head bodies are mounted in a suitable rotating jig fixture which is mounted for rotation across the path of a spray gun which discharges an inert gas which has been passed through a high-voltage electric arc to produce an excited high-speed plasma flow at elevated temperatures up to 30,000° F. The powdered coating material to be sprayed is fed into the high temperature, high-speed gas discharge and is melted to form a plasma which is carried by the jet flow as a fluid material onto the face of the head. With the brass substrate base material, the temperature of the substrate normally rises to slightly less than 190° F. By controlling the temperature rise of the head being sprayed by the use of a more efficient cooling air stream and adjusting the speed at which the jig is rotated, as well as the temperature of the gases being discharged, I have found that it is possible to use an inexpensive plastic substrate as previously stated. Plastic is not as thermally stable as brass, but I have discovered that the stability can be materially increased by the spraying of the face of the substrate body with the wear-resistant material, thus providing the necessary stability for various uses and applications of the head units. The plastic base material also has the advantage that it is a far more ductile material than is the more dense, heavier brass body material so that the layer of wear-resistant material will have sufficient strength to resist expansion and contraction of the body due to temperature changes and will not be fractured by such conditions which may occur during shipping, storage, and occasionally in use. In other words, the overcoat of the wear-resistant material has sufficient strength to resist distortion of the plastic material when exposed to temperature variations to prevent fracturing of the coating material, which obviously would destroy its usefulness. Due to the forces generated within a conventional brass body during such ambient temperature changes, such fracturing of the outer wear coating frequently occurs.

DETAILED DESCRIPTION OF THE PREFERRED EMBODYMENT

Figure 1:
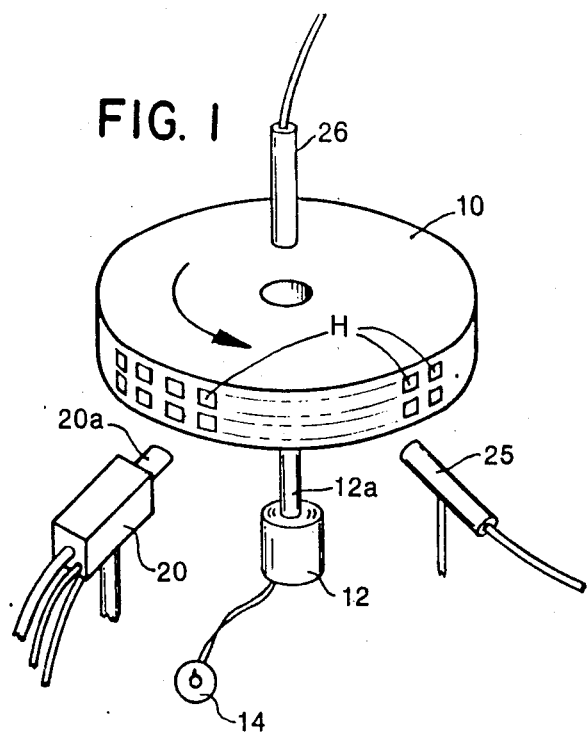
FIG. 1 is a diagrammatic perspective view of the rotary jig fixture and spraying apparatus.
Figure 3:
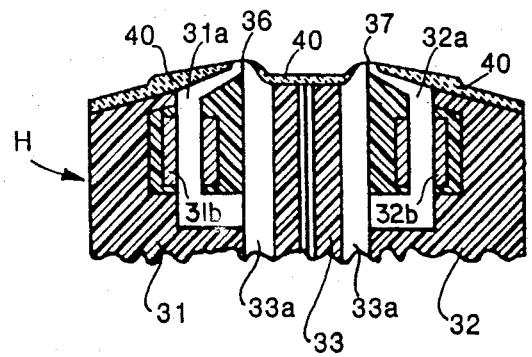
FIG. 3 is a central vertical sectional view taken through the head shown in FIG. 2.
Figure 2:
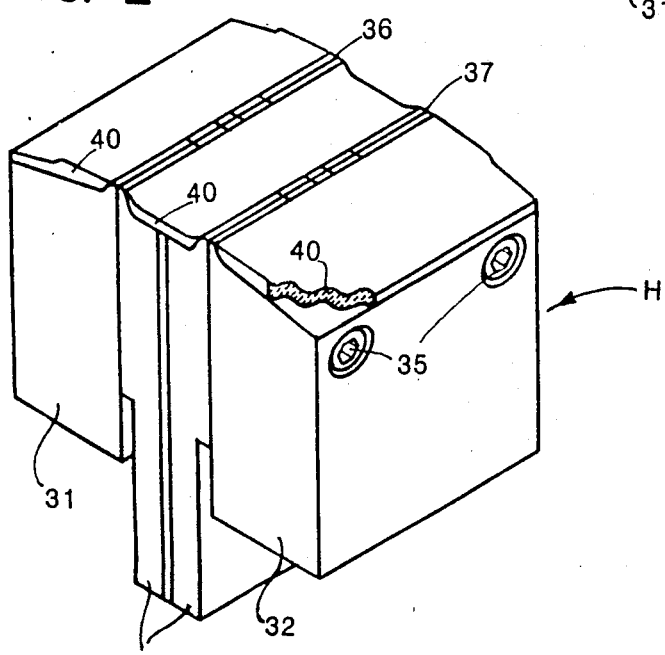
FIG. 2 is a perspective view of a completed magnetic head embodying this invention.

As best shown in FIG. 1, a rotary jig in the form of a cylindrical fixture 10 is mounted for counterclockwise rotation on its vertical axis. An array of magnetic heads H is mounted in suitable windows provided in the cylindrical outer shell of the fixture. Suitable means are provided for rotating the fixture 10 such as an electric motor 12 connected at the center of the fixture by the shaft 12a. Suitable means for controlling the speed of rotation of the fixture 10 are provided such as a rheostat 14.

A plasma spray gun 20 is provided and its discharge nozzle 20a is directed toward the heads H mounted on the rotary fixture 10 generally radially thereto. A cooling nozzle 25 is provided downstream of the gun 20 for discharging cooling air against the faces of the heads H mounted on the fixture 10. Thus, as soon as the hot plasma from the gun 20 is deposited on the face of each head H, the cooling nozzle 25 directs cooling air against the heads. A second cooling nozzle 26 is directed into the hollow fixture for cooling the fixture assembly. Each head H is usually constructed of a plurality of sections such as 2, 3, 4 or occasionally more. The head illustrated has a three-piece body assembly which includes the two outer body segments 31 and 32 with an inner segment 33 sandwiched therebetween. The three-piece assembly is attached together as by the bolts 35. The three segments are preferably made from a thermoplastic material which can be readily molded as by a conventional injection molding operation. The segments 31 and 32 contain C-shaped magnetic core pieces 31a and 32a with the coils 31b and 32b respectively wrapped therearound as in a typical magnetic head construction. A pair of I-core pieces 33a are carried by the inner segment 33 and combine with the C-core pieces 31a and 32a to complete the magnetic circuit in the conventional manner and define the gaps 36 and 37.

With the three segments of the head H assembled, the head unit is anchored in position in one of the windows of the jig fixture 10 with the face of the head H facing outwardly in opposed relationship to the discharge of the plasma spray gun 20, as best shown in FIG. 1. When the assembled heads to be sprayed have been secured in place in the jig fixture 10, the motor 12 is energized to rotate the fixture and the speed of the motor and the jig fixture 10 is adjusted by means of the rheostat 14. The cooling blowers 25 and 26 are actuated and the temperature of the heads H is monitored by any suitable conventional means to insure that the temperature rise thereof during the spraying operation does not exceed the prescribed maximum tolerance. This temperature is controlled by varying the speed of rotation of the jig fixture 10 so that by increasing the speed, the exposure time of each individual head to the hot spray plasma from the gun 20 will be reduced. In addition to this means for controlling the temperature of the head during the spraying operation, the discharge of the cooling nozzles 25 and 26 can be increased as well as decreasing the temperature thereof. It is also possible to reduce the temperature of the plasma being sprayed, thus providing a third method for controlling the temperature of the heads H being sprayed.

The thickness of the coating 40 ultimately produced after the required number of exposures to the plasma flow from the gun 20 should be between 0.010 and 0.015 inches. After completion of the spraying operation, the heads are removed from the fixture 10 and the spray coating is ground from the gaps 36 and 37 in the normal manner. This permits the concentration of magnetic flux to be maintained as in conventional magnetic heads.

Since the tolerances which must be maintained with respect to these magnetic tape heads are within forty to fifty millionths of an inch, it is important that the material used for the body has the degree of stability necessary to maintain these tolerances during operation. During the development of this invention it was found that the material from which the body was made should have a Heat Deflection Temperature of above 400° F. according to ASTM Method 648D and provide the required dimensional stability for operating temperatures up to 350° F.

The following is a partial list of suitable plastic materials:

| Manufacturer | Address |
|---|---|
| Thermoplastic Materials | |
| Generic Name: Polyphenylene Sulfide (fiber filled) | |
| Product Trademark | |
| Ryton R-4 | Phillips Chemical Co. Bartlesville, OK |
| Generic Name: Poly Amide - Imide | |
| Product | |

| Manufacturer | Address |
|---|---|
| Trademark | |
| Torion | Amoco Chemical Corp. Chicago, IL |
| Thermosetting Plastic Materials | |
| Generic Name: Alkyds | |
| Product No. or Trademark | |
| #24060 | Durez, Div. of Hooker Chemicals & Plastic Corp. Tonawanda, NY |
| Generic Name: Diallyl Phthalates (DAP) | |
| Product No. or Trademark | |
| RX2-520 | Rogers Corp. Rogers, CN |
| Generic Name: Epoxy | |
| Product No. or Trademark | |
| #2648 | Fiberite Co. Winona, MN |
| Generic Name: Phenolics | |
| Product No. or Trademark | |
| RX862 | Rogers Corp. Rogers, CN |
| Generic Name: Polyesters (Thermoset) | |
| Product No. or Trademark | |
| 5-680 | Fiberite Co. Winona, MN |
| Generic Name: Polyimide | |
| Product No. or Trademark | |
| Kinel-5504 | Rhone-Poulene, Inc. Monmouth Jct., NJ |

Those skilled in the art will be aware that thermoplastics and thermosetting plastics all have the capability of being molded either by an injection molding process or by compression molding process, or a combination of the two. It should also be pointed out that while molding is by far the most convenient and least expensive, other materials such as polyimide can also be used, in which case a sintered forming process is required. A suitable polyimide material is manufactured by the Dupont Company of Wilmington, Del. under the trademark VESPEL.

It should also be pointed out that the most common product used for the wear coat as sprayed by the plasma gun 20 is alumina titania which is a ceramic material. However, a number of other sprayed-on, long-wearing materials have also proven satisfactory such as Tungston Carbide, Pure Alumina, chrome oxide, molybdenum and Triboloy which is a Dupont trademark for a suitable, long wearing product.

It should be pointed out that the temperature rise above room temperature for the head using a plastic body element must be kept between 40° F. and 60° F. and preferably below 50° F. in order to prevent excessive distortion during the spray coating process. In the case of the brass body elements used in prior art structures, the temperature rise was permitted to exceed 115° F.

In other words, the maximum temperature with the plastic body should be limited to 130° F. and while the permissible maximum temperature with a brass body could be as high as 190° F.

In addition to the cost advantage, the plastic body produces a substantial reduction in the weight of the magnetic head assembly. This is important for a number of reasons, one of which being that modern technology in the computer tape drive equipment includes the rapid movement of the head under the tape for the purpose of locating the tracks in the head to different positions in the tape. Obviously, the lighter-weight head unit will be of great advantage in any such mechanism.

It should also be pointed out that the sprayed-on, wear resistant coating applied to the entire face of the plastic body provides additional mechanical stability for the upper body portion to prevent distortion thereof during the temperature fluctuations and other stresses that are applied to the head which may occur during manufacture, shipping, installation, and operation.

What is claimed is:

1. The method of producing a magnetic head comprising, providing a plastic body of the desired size and shape and having a tape-engaging face, spraying by means of a high-temperature plasma spray gun the tape-engaging face with a coating of stabilizing wear resistant material of between 0.010 and 0.015 inches in thickness to provide additional mechanical stability to the face and upper portion of the head unit, and directing a flow of cooling air onto the plastic head downstream of the spraying operation as soon as the material has been deposited and producing intermittent impingement of the coating spray on the face to permit maintaining the temperature of the head during the spraying operation at between 100° F. and 130° F.

2. The method set forth in claim 1 wherein the temperature of said head is maintained between 110° F. and 120° F.

3. The method set forth in claim 1 and moving a plurality of heads to be sprayed through the spray path of the gun to produce the required intermittent impingement of the spray on the face.

* * * * *